United States Patent [19]

Wozniak

[11] Patent Number: 5,021,482

[45] Date of Patent: Jun. 4, 1991

[54] ADHESION AND PAINTABILITY IMPROVEMENTS IN PVC PLASTISOLS AT LOW BAKE TEMPERATURES

[75] Inventor: Don S. Wozniak, Powell, Ohio

[73] Assignee: Schering Berlin Polymers Inc., Dublin, Ohio

[21] Appl. No.: 570,966

[22] Filed: Aug. 21, 1990

[51] Int. Cl.$^5$ .................. C08K 8/34; C08F 5/30
[52] U.S. Cl. ................... 524/100; 524/178; 524/567; 524/569; 525/180
[58] Field of Search ............ 524/100, 178, 567, 569; 525/180

[56] References Cited

U.S. PATENT DOCUMENTS

| | | | |
|---|---|---|---|
| 4,146,520 | 3/1979 | Bierwirth et al. | 523/400 |
| 4,533,524 | 8/1985 | Burba et al. | 524/297 |
| 4,652,327 | 3/1987 | Hayes et al. | |
| 4,673,710 | 6/1987 | Burba et al. | 525/113 |
| 4,717,746 | 1/1988 | Leoni et al. | |

*Primary Examiner*—Joseph L. Schofer
*Assistant Examiner*—Mark Sweet
*Attorney, Agent, or Firm*—Scully, Scott, Murphy & Presser

[57] ABSTRACT

The present invention provides a new vinyl chloride polymer coating material which can be top-coated with acid-catalyzed coating compositions at low curing temperatures without compromising the adhesion of the coating to the metal substrate and without inhibiting the cure of subsequently applied coating. In accordance with the present invention, a new plastisol coating composition comprises a finely-divided vinyl chloride polymer together with a plasticizer and from about 0.5 to about 5 percent by weight of a composition of an adhesion promoter which is a non-gelled condensation product of a) a polymerized fatty acid; and
b) a mixture of amines being present in a concentration to produce a final amine value that ranges up to about 225, said mixture being comprised of a polyalkylene polyamine and an N-aminoalkylpiperazine.

In addition, the present invention provides a new and improved adhesion promoter for use in the aforesaid vinyl chloride polymer coating composition. This adhesion promoter is comprised of the condensation product of a polymeric fatty acid and an amine mixture of a polyalkylene polyamine and an N-aminoalkylpiperazine.

14 Claims, No Drawings

ADHESION AND PAINTABILITY IMPROVEMENTS IN PVC PLASTISOLS AT LOW BAKE TEMPERATURES

This application is a continuation division of application Ser. No. 295,564, filed Jan. 10, 1989.

BACKGROUND OF THE INVENTION

1. Field of the Invention

The present invention relates to a process for the bonding of metallic materials and for the production of coatings on metallic materials with a polyvinyl chloride plastisol having improved adhesion and paintability at baking temperatures of 90° C. and up, which plastisol contains, as an adhesion- and paintability-improving additive, a condensation product of a polymerized fatty acid, and a polyalkylene polyamine together with an N-aminoalkylpiperazine.

Polyvinyl chloride and its copolymers have long been known to possess resistance to deterioration caused by the action of aggressive media and they are, therefore, widely used to impart corrosion resistance to metallic surfaces, to bond thin sheet metal structures and to seal welds, especially on preprimed metal in the automotive field.

Such coatings are applied to the surface of the material to be protected mainly in the form of a plasticized vinyl chloride polymer (plastisol) by spread coating, roller coating, spray coating or the like. In one widely used form, a plastisol coating material is prepared by combining a plasticizer or mixture of plasticizers, a polyvinyl chloride, formable into a paste and distinguished in particular by a definite swelling capacity in the plasticizer, one or more fillers, stabilizers and, optionally, pigments and PVC processing aids.

2. Description of the Prior Art

The formulation of plasticized polyvinyl chloride (PVC) coating materials, their preparation and methods of applying them are described in great detail in Krekeler Wick, Kunststoff-Handbuch ("Plastics Handbook"), 1963, Vol. II, Part 1, pp. 396 et. seq.

The adhesion of the plastisol to the material to which it is applied is an important criterion for its performance. This is particularly true when the plastisol is used as a coating on preprimed metal parts. Poor adhesion of this PVC protective coating to either bare or preprimed metal reduces the efficiency of the protective coating. It also increases the likelihood of penetration by aggressive media. Water, for example, can readily seep in between the coating and the primed metal and degrade the integrity of the system. The poorer the adhesion of the protective film to the metal, the greater the likelihood that this will occur. An additional advantage of the plastisol of this invention is the inherent flexibility of the cured plastisol when compared to competitive systems such as acrylics.

The paintability of plastisols applied to materials such as metallic surfaces at low-bake temperatures is important in the automotive industry which applies top coatings to plastisols that are cured by acid catalysis at low-bake temperatures. The basicity of the adhesion promoter should not, therefore, interfere with such paint systems Thus, there has been a need for plastisols which make it possible to produce high-strength bonds between a wide variety of materials, especially metallic materials, and to apply acid-cured top coatings to these materials especially at low-bake temperatures. According to U.S. Pat. No. 4,146,520, polyaminoamides having a certain imidazoline content and made from a polymerized mixture of fatty acids with a high content of trimeric and higher polymeric fatty acids and an excess of polyalkylene polyamines, are used as adhesion promoters in an amount from 0.5 to 5 weight percent, based on the plastisol mass.

According to U.S. Pat. No. 4,717,746, heterocyclic amines of the formula

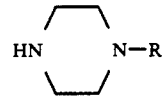

wherein R is hydrogen or an aminoalkyl group, —R'—NH$_2$, in which R' is a saturated aliphatic chain, form adhesion promoters when condensed with polymerized fatty acids. However, when such promoters were used at relatively low cure temperatures, for example below 140° C., the adhesive properties of the plastisols were found to be below acceptable commercial levels as described in Table III.

These polyaminoamides effectuate a definite improvement in adhesive strength. When used in low concentrations, however, and at low baking temperatures, they leave room for further improvement with respect to adhesion, thermal stability, elongation at rupture and paintability of the cured PVC plastisol.

SUMMARY OF THE INVENTION

The present invention provides a new and novel vinyl chloride polymer coating material which can be top-coated with acid-catalyzed coating compositions at low curing temperatures without compromising the adhesion of the coating to the metal substrate and without inhibiting the cure of subsequently applied coating. This final coating can abe applied to the plastisol after the plastisol is cured (wet on dry); however, the unique advantages of this invention are most clearly shown when the second coat is applied to the uncured plastisol (wet on wet).

In accordance with the present invention, a new plastisol coating composition comprises a finely-divided vinyl chloride polymer together with a plasticizer and from about 0.5 to about 5 percent by weight of a composition of an adhesion promoter which is a non-gelled condensation product of a) a polymerized fatty acid; and
b) a mixture of amines being present in a concentration to produce a final amine value that ranges up to about 225, said mixture being comprised of a polyalkylene polyamine and an N-aminoalkylpiperazine.

In addition, the present invention provides a new and improved adhesion promoter for use in the aforesaid vinyl chloride polymer coating composition. This adhesion promoter is comprised of the condensation product of a polymeric fatty acid and an amine mixture of a polyalkylene polyamine and an N-aminoalkylpiperazine, especially N-aminoethylpiperazine.

The present plastisol composition is particularly useful as a seam sealer for the interior and exterior surfaces of automobiles which are overpainted with a final enamel, particularly a high solid coating which is preferably acid-catalyzed. Such coatings are exemplified by melamine formaldehyde hydroxyacrylics as set forth in U.S. Pat Nos. 4,397,989 and 4,430,458.

To secure adhesion of such topcoatings to bare or primed metal surfaces, the dual objective of low curing temperature and non-interference with the acid cure of the topcoating must be achieved without compromising the adhesion of the vinyl chloride polymer plastisol to the metal substrate. The plastisol composition of the present invention accomplishes this dual objective without comprising plastisol adhesion to the substrate.

By comparison, plastisols prepared in accordance with the aforesaid U.S. Pat. Nos. 4,146,520 and 4,717,746 fail to provide the excellent adhesive properties demonstrated with the present plastisol. Specifically, when the plastisol composition of U.S. Pat. No. 4,146,520 is employed, the topcoating does not cure due to the high amine content of the plastisol. The high amine content of the plastisol composition of the '520 patent interferes with the acid catalyst of the topcoat. On the other hand, when the amine content of the plastisol of the '520 patent is reduced, the composition gells and is not useful. It is emphasized that curing at low temperatures is desired in the automobile industry, a major user of plastisol compositions.

The present plastisol compositions, as well as the adhesion promoter composition, is characterized by a lower amine value than is empolyed in the composition of the aforesaid U.S. Pat. No. 4,146,520. The amine value of the present invention ranges up to about 225 with the range 150-220 being especially preferred. This reduction is accomplished by substituting part of the polyalkylene polyamine with an N-aminoalkylpiperazine. For whatever reason, the inclusion of the N-aminoalkylpiperazine prevents gellation of the polyamidoamine adhesion additive which occurs when the normal polyalkylene polyamine level is reduced to avoid interfering with the acid catalyst of topcoating compositions. The ratio of the equivalent weights of aminoalkylpiperazine to the equivalent weights of the other polyamines is from about 1 to 5 to about 1 to about 0.25. The equivalent weight of polyamines for the purposes of this invention represents the average molecular weight of the polyamine divided by the number of primary and secondary amino groups. The equivalent weight of polyamines is calculated by dividing 56,108 (molecular weight of KOH multiplied by 1000) by the Total Amine Value (TAV) of the polyamine. The TAV is determined by perchloric acid potentiometric titration (ASTM D2073). The equivalent weight of the aminoalkylpiperazine is calculated by dividing the molecular weight by two.

The polyamidoamine compositions of U.S. Pat. No. 4,146520 usually comprise about 35 percent by weight polyalkylene polyamine. In the new plastisol compositions of the present invention, the amine mixture for forming the polyamidoamine is below 30% by weight of the polymeric fatty acid and amine mixture collectively. Preferably, the amine mixture comprises below 25% by weight based on the total polymeric fatty acid and amine mixture weight.

PREFERRED EMBODIMENTS

The N-aminoalkylpiperazines to be employed in this invention are represented by the formula

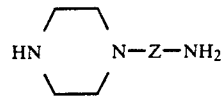

in which Z is an alkylene chain of up to 3 carbon atoms and a total of 5 carbon atoms. Such compounds are either readily available or easily synthesized in the laboratory. Of these, N-aminoethylpiperazine of the formula

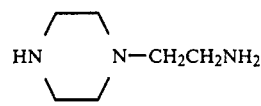

is preferred.

A "polymerized fatty acid" refers, in a general way, to polymerized acids obtained from fatty acids. Fatty acids are unsaturated natural and synthetic monobasic aliphatic acids having from 8 to 22 carbon atoms, preferably 18 carbon atoms. Fatty acids can be polymerized by known processes.

Polymeric fatty acids suited for use in accordance with the invention are commercial products having approximately the following composition:

| | |
|---|---|
| Monomeric acids | 5 to 15 weight percent |
| Dimeric acids | 55 to 80 weight percent |
| Trimeric and higher polymerized acids | 10 to 35 weight percent |

In addition, polymerized fatty acids having a high trimer content may also be employed. These acids may be prepared by selective reaction based on a free-radical mechanism according to published German Pat. application No. DOS 25 06 211 or by generally known distillation methods from typical commercially available products and have approximately the following composition:

| | |
|---|---|
| Monomeric acids | 0 to 5 weight percent |
| Dimeric acids | 10 to 25 weight percent |
| Trimeric and higher polymerized acids | 90 to 75 weight percent |

An especially preferred polymeric fatty acid for use in the invention is a commercially available dimer acid, Empol 1024 (Emery Industries, Inc.) having a reported composition of 75% dimeric acids, 25% trimeric acids and a trace of monomeric acids. Other Empol dimer and trimer acids are also preferred.

Suitable polyalkylene polyamines to be used in accordance with the invention are, in particular, amines which are capable of imidazoline formation. These are of the general formula

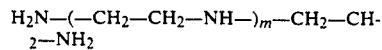

wherein m is 1 to 5, for example, diethylenetriamine, triethylenetetramine or tetraethylenepentamine. These polyalkylene polyamines may optionally also contain amounts of other amines (see Ullmann Enzyklopaedie der Technischen Chemie, Vol. 14, 1963, p. 74). Also, polyalkylene polyamines not capable of imidazoline formation and of the general formula

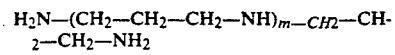

wherein m is 1 to 4, for example, dipropylenetriamine or tripropylenetetramine may be used. Polyalkylene polyamines having ethylene and propylene bridges as alkylene groups, obtained by the cyanoethylation of the amines followed by hydrogenation (for example, $N_3$—amine and $N_4$—amine, see pamphlet of BASF AG, 1976), are also suitable for use.

In accordance with the invention, other amines, too, may be used, such as amines of the general formula

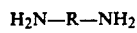

wherein R is aliphatic hydrocarbon, optionally substituted or interrupted by hetero atoms and in particular by oxygen atoms, having from 2 to 36 carbon atoms and more particularly from 6 to 20 carbon atoms, such as 1,2-diaminoethane, 1,6-diaminohexane, 1,9-diaminononane, 1,12-diaminododecane, dimeric fatty acid amine (prepared by known processes from dimeric fatty acids), the 2,2,4(4,4,2)-trimethylhexamethylene-diamines, 1,7-diamino-4-oxa-heptane, 1,12-diamino-4,9-dioxadodecane, or 1,20-diamino-4,17-dioxaeicosane.

The mixture of amines and polymerized fatty acid is condensed employing known procedures. For example, the reactants are reacted simultaneously in a reactor at a temperature of about 180–225° C., optionally, under vacuum. Any remaining water of reaction can be finally removed by reducing pressure in the reactor. The reaction product may then be diluted with solvent to whatever desired solids content and be ready for use in producing the vinyl chloride polymer plastisol. The solvent is preferably present at 10–70 percent of the condensation product.

The baking temperature which is optimum for a given polyvinyl chloride formulation (and which depends also on the gellation temperature of the PVC formulation used) can usually be determined simply by trial and error.

Suitable substrates for coating or bonding are all materials commonly used in this field, particularly metals and glass.

The following examples are given to further illustrate the present invention.

EXAMPLE 1

Preparation of Plastisol Adhesion Promoter No. 1

A closed reactor was charged with 3,890 g of Empol 1024 dimer acid (equivalent weight 292; 13.3 equivalents) having the predominent structural formula

690 g N-aminoethylpiperazine (equivalent weight 64.8; 10.7 equivalents); and 421 g triethylenetetraamine (equivalent weight 39.5; 10.7 equivalents) under a nitrogen atmosphere. The reactants were stirred by an agitator provided in the reactor and heated. As soon as water of condensation appeared in the reactor, the nitrogen gas supply was stopped and the temperature increased to bring the reaction mixture to reflux. The reaction was allowed to continue at a reflux temperature of between 190° C. and 250° C. at atmospheric pressure. The acid value of the reaction mixture was monitored and upon reaching an acid value of 2, the reactor was subjected to a mild vacuum. This was continued until the reaction pressure was reduced to 5 mm Hg. The reaction was continued at these thermodynamic conditions, 190° C. to 250° C. and 5 mm Hg, until the reaction mixture acid value dropped below 1.0.. At that time the reactor was cooled to 150° C., atmospheric pressure was reinstituted, by the addition of nitrogen gas, and Hisol (Ashland Oil Co., highly aromatic solvent) was added to acceptable handling viscosity. The addition of the Hisol permitted cooling of the reaction mixture to ambient temperature. The product of this reaction was a liquid weighing 9,520 g.

Analysis of the product of this reaction, the PVC plastisol adhesion promoter, provided the following characteristics: an acid value of 0.78 (determined by the method of ASTM D16639-70), a TAV of 74.0; a Gardner color of 10 and a viscosity at 25° C. of 8,880 centipoise.

EXAMPLE 2

Preparation of PVC Plastisol Composition Incorporating Adhesion Promoter (Plastisol Composition No. 1)

A PVC plastisol containing the adhesion promoter formed in accordance with Example 1 was prepared by dissolving 5 g of the adhesion promoter in 30 g butyl cyclohexyl phthalate, 30 g dihexyl phthalate, 50 g di(C-7–C11) phthalate and 5 g benzyl alcohol. The thus formed solution was added to a preblended, finely divided solid mixture of: 60 g Vestolite 7090 polyvinyl chloride copolymer (Huls AG), 40 g Bordon VC265 polyvinyl chloride copolymer, 110 g calcium carbonate, 30 g precipitated calcium carbonate and 15 g titanium dioxide. The solid and liquid components were mixed together under high shear to provide a smooth consistent plastisol mixture.

The formulation of the polyvinyl chloride (PVC) plastisol composition of this example, denoted as Plastisol Composition No. 1, is summarized in Table I below.

EXAMPLE 3

Preparation of PVC Plastisol Composition Nos. 2–6

Additional PVC plastisol compositions were prepared by dissolving 5 g of the adhesion promoter formed in Example 1 with mixtures of benzyl alcohol and various phthalate compounds. These liquid solutions were added to preblended, finely divided solid mixtures of polyvinyl chloride, calcium carbonate and, in some cases, titanium dioxide in accordance with the procedure of Example 2.

The exact constituency of these compositions is provided in Table I below which summarizes Plastisol Composition Nos. 2 to 5.

TABLE I

| PVC Plastisol Composition No. | Component | Wt, g |
|---|---|---|
| 1 | Vestolite 7090 PVC Copolymer | 60 |
| | Bordon VC265 PVC Copolymer | 40 |
| | $CaCO_3$ | 110 |
| | Precipitated $CaCO_3$ | 30 |
| | $TiO_2$ | 15 |
| | Butyl Cyclohexyl Phthalate | 30 |
| | Dihexyl Phthalate | 30 |
| | di(C7-C11) Phthalate | 50 |
| | Benzyl Alcohol | 5 |
| | Adhesion Promotor No. 1 | 5 |
| 2 | Vestolite 7090 PVC Copolymer | 60 |

TABLE I-continued

| PVC Plastisol Composition No. | Component | Wt, g |
|---|---|---|
| | Bordon VC265 PVC Copolymer | 40 |
| | CaCO3 | 125 |
| | Precipitated CaCO3 | 30 |
| | Nuoplaz 1046, (Huls AG) Phthalate Isobutyrate Ester polyol from Texanol (Eastern) | 35 |
| | di(C7-C11) Phthalate | 35 |
| | Butyl Benzyl Phthalate | 30 |
| | Benzyl Alcohol | 5 |
| | Adhesion Promoter No. 1 | 5 |
| 3 | Vestolite 7090 PVC Copolymer | 60 |
| | Bordon VC265 PVC Copolymer | 40 |
| | CaCO3 | 30 |
| | Precipitated CaCO3 | 50 |
| | Butyl Cyclohexyl Phthalate | 50 |
| | di(C7-C11) Phthalate | 25 |
| | Dihexyl Phthalate | 25 |
| | Benzyl Alcohol | 5 |
| | Adhesion Promoter No. 1 | 5 |
| | Geon 130 × 33 (B. F. Goodrich) PVC copolymer | 60 |
| | Pliovic MC-85 (Goodyear) Maleic Ester Copolymer | 40 |
| | CaCO3 | 110 |
| | Precipitated CaCO3 | 30 |
| | TiO2 | 15 |
| | Butyl Cyclohexyl Phthalate | 30 |
| | Dihexyl Phthalate | 30 |
| | di(C7-C11) Phthalate | 50 |
| | Benzyl Alcohol | 5 |
| | Adhesion Promotor No. 1 | 5 |
| 5 | Oxy 6493 (Occidental Chemical Corp.) PVC Homopolymer | 60 |
| | Bordon VC265 PVC Copolymer | 40 |
| | CaCO3 | 110 |
| | Precipitated CaCO3 | 30 |
| | TiO2 | 15 |
| | Butyl Cyclohexyl Phthalate | 30 |
| | Dihexyl Phthalate | 30 |
| | di(C7-C11) Phthalate | 50 |
| | Benzyl Alcohol | 5 |
| | Adhesion Promotor No. 1 | 5 |
| 6 | Oxy 6338 PVC Copolymer | 60 |
| | Bordon VC265 PVC copolymer | 40 |
| | CaCO3 | 110 |
| | Precipitated CaCO3 | 30 |
| | TiO2 | 15 |
| | Butyl Cyclohexyl Phthalate | 30 |
| | Dihexyl Phthalate | 30 |
| | di(C7-C11) Phthalate | 50 |
| | Benzyl Alcohol | 5 |
| | Adhesion Promoter No. 1 | 5 |

EXAMPLE 4

Adhesion Characteristics of PVC Plastisol Compositions

Each of the PVC plastisol compositions tabulated in Table I were tested to determine their adhesion. In this test 5 g of each of the plastisol compositions of Table I were placed on a Uni-Prime coated test panel, a standard test panel supplied by PPG, and which is primed by electro-deposition. The plastisol composition was drawn across the panel with a drawdown bar such that a 0.02 inch thick film was formed over an area of 1 inch by 3 inches. The plastisol film, disposed on the test panel, was cured for 20 minutes at 120° C. in a forced air heated oven and then cooled for 30 minutes. Two parallel slits, approximately ½ inch apart, were cut into the cured plastisol film with a razor blade. One end of the strip between the cuts was lifted off the test panel with a spatula and then pulled. If the film tore, adhesion was greater than cohesion.

Each of the plastisol compositions of Table 1, Composition Nos. 1-6, were tested in accordance with the above procedure and were each found to possess an adhesion greater than cohesive. That is, the cured plastisol film tore in each test.

EXAMPLE 5

Wet-on-Wet Paintability of PVC Plastisol Compositions

A test was made to determine the wet-on-wet paintability of the plastisol compositions of Table I. In these tests a Uni-Prime coated test panel was again coated with each of the plastisol compositions of Table I in accordance with the procedure of Example 4.

A high solids enamel paint was spray applied over the unbaked PVC plastisol compositions. The thus formed test panel, covered with the plastisol film and enamel paint topcoat, was baked at 120° C. for 30 minutes in a forced air oven and thereafter cooled for 30 minutes. If the enamel topcoat dried with no residual tack, the plastisol was considered to have passed the test.

All six compositions tabulated in Table I were found to be dry, thus, establishing that the paint had cured in each case.

EXAMPLE 6

Tensile and Elongation Characteristics of Plastisol Compositions

The tensile and elongation characteristics of the PVC plastisol compositions of Table I were tested by initially spraying a mold release agent onto aluminum foil. Five grams of each of the plastisol compositions of Table I, Plastisol Composition Nos. 1-6, were applied to the aluminum foil treated with the mold release agent and drawn down in accordance with the procedure set forth in Example 4. In each case, the thus formed 0.02 inch film of the PVC plastisol composition was cured at a temperature of 120° C. for 30 minutes in a forced air oven. The film was then removed from the foil surface and its tensile strength and elongation were determined in accordance with ASTM Test Method 1412-61 T.

The results of these tests, for each of the six tested PVC plastisol compositions, appear below in Table II.

TABLE II

| PVC Plastisol Composition No. | Elongation, % | Tensile Strength, kg/cm$^2$ |
|---|---|---|
| 1 | 103 | 26.4 |
| 2 | 105 | 26.1 |
| 3 | 167 | 34.5 |
| 4 | 85 | 20.4 |
| 5 | 75 | 19.7 |
| 6 | 123 | 22.0 |

In addition to the examples showing the utility of the invention in various plastisol compositions, variations in the composition of the additive were also made to determine the scope. Plastisol adhesion promotors Nos. 2-22 were prepared as described in Example 1 with the equivalent weights of the polyamines indicated in Table III and one equivalent of dimer acid. The dimer acid Empol 1024 (Emery 10 Industries) was used in Examples 2-18; Empol 1014 (Emery Industries) was used in Examples 21 and 22.

Since adhesion promotors Nos. 12-22 gelled or became too viscous to handle during preparation, they could not be subjected to additional testing. It is noted where the condensation product shows high viscosity it may be made operable by those skilled in the art by addition of an appropriate amount of an organic solvent.

Adhesion promotors Nos. 2–11 were formulated into one of the plastisol compositions Nos. 1–5 of Table I and tested for adhesion according to Example 4 and for paintability according to Example 5, respectively. The results are reported in Table III

TABLE III

| Adhesion Promotor | Equivalent Weights | | | Wt. % AEP in amines | Wt. % amines in Promotor | TAV | Characteristics(1) |
|---|---|---|---|---|---|---|---|
| | AEP | TETA | TEPA | | | | |
| 2 | 0.8 | 0.8 | — | 62 | 22.2 | 157 | Good A & P |
| 3 | 0.8 | 0.8 | — | 62 | 22.2(2) | 157 | " |
| 4 | 0.8 | 0.4 | 0.4 | 60 | 22.8 | 156 | " |
| 5 | 1.2 | 0.4 | — | 83 | 24.3 | 191 | " |
| 6 | 1.0 | 0.5 | 0.5 | 60 | 27.0 | 220 | " |
| 7 | 0.5 | 0.75 | 0.75 | 33 | 24.9 | 188 | Pass A & P |
| 8 | — | 1.3 | 1.3 | 0 | 27.7 | 232 | Good A, Poor P |
| 9 | 1.5 | 0.25 | 0.25 | 82 | 28.9 | 250 | " |
| 10 | 1.0 | — | — | 100 | 18.0 | 82 | Poor A |
| 11 | 2.0 | — | — | 100 | 30.7 | 277 | " |
| 12 | 1.0 | — | — | 100 | 12.9(3) | 82 | Gelled |
| 13 | 1.0 | 0.2 | — | 89 | 19.9 | 113 | " |
| 14 | 0.7 | 0.35 | 0.35 | 60 | 20.5 | 120 | " |
| 15 | 0.7 | — | 0.7 | 58 | 21.1 | 121 | " |
| 16 | 0.7 | 0.4 | 0.4 | 57 | 21.5 | 134 | " |
| 17 | 1.0 | 0.4 | — | 80 | 21.6 | 142 | Gelled |
| 18 | 0.8 | — | 0.8 | 58 | 21.9 | 154 | " |
| 19 | — | 1.0 | 1.0 | 0 | 21.0(4) | 155 | " |
| 20 | — | 1.1 | 1.1 | 0 | 22.6(4) | 155 | " |
| 21 | — | 1.0 | 1.0 | 0 | 22.9 | 155 | " |
| 22 | — | 1.1 | 1.1 | 0 | 24.6 | 182 | Too Viscous |

Abbreviations: AEP, N-aminoethylpiperazine; TETA, triethylenetetramine; TEPA, tetraethylenepentamine; TAV, Total Amine Value.
(1)The adhesion promoter was formulated into a plastisol composition and tested for adhesion (A) as described in Example 4 and paintability (P) as described in Example 5.
(2)Mixed 50:50 wt/wt with Benzyl Alcohol after reaction.
(3)Piperazine was used instead of N-aminoethylpiperazine.
(4)0.25 equivalents 2-ethyl hexanol (equivalent weight 130 g) charged into the reaction mixture.

These results indicate that replacing a portion of the polyamines with N-aminoethylpiperazine produced an adhesion promoter with the best combination of properties in the cured plastisol. Adhesion promotors, formulated solely with N-aminoethylpiperazine, imparted poor adhesion to the plastisol compositions. Adhesion promotors formulated solely with polyalkylene polyamines either gelled during preparation due to insufficient amine content or imparted poor paintability to the plastisols due to excessive amine content. Those formulations that contained N-aminoethylpiperazine in combination with an amount of polyalkylene polyamines sufficient to impart an amine value up to about 225 provided a polyvinyl chloride plastisol composition with the desired properties of good adhesion and paintability upon low temperature curing.

What is claimed is:

1. An adhesion promoter for vinyl chloride plastisols comprising the non-gelled condensation product of
   a) a polymerized fatty acid, and
   b) a mixture of amines being present in a concentration to produce a final amine value that ranges up to about 191 in the condensation product, and said mixture being comprised of a polyalkylene polyamine and an N-aminoalkylpiperazine.

2. An adhesion promoter according to claim 1 wherein said polymerized fatty acid is a dimer fatty acid.

3. An adhesion promoter according to claim 1 wherein the mixture of amines comprises about 20 to about 30% by weight of the condensation product.

4. A adhesion promoter according to claim 1 wherein the polyalkylene polyamine is triethylenetetramine or tetraethylenepentamine, or mixtures thereof.

5. A composition according to claim 1 wherein 0.5 to 1.5 equivalents of the N-aminoalkylpiperazine is present per equivalent of the polymerized fatty acid.

6. An adhesion promoter according to claim 1 wherein said N-aminoalkylpiperazine is N-aminoethylpiperazine.

7. An adhesion promoter according to claim 1 further comprising an organic solvent.

8. An adhesion promoter for vinyl chloride plastisols which is a non-gelled condensation product of
   a) polymerized fatty acid; and
   b) a mixture of amines being present in a concentration to provide at least 1.5 equivalents thereof per equivalent of polymerized fatty acid and to produce a final amine value that ranges up to about 191 in the condensation product, said mixture being comprised of triethylenetetramine, tetraethylenepentamine or mixtures thereof, and N-aminoethylpiperazine.

9. A composition according to claim 8 wherein the polymerized fatty acid is a dimer fatty acid.

10. A composition according to claim 8 wherein the mixture of amines comprises about 20 to about 30 percent by weight of the condensation product.

11. A composition according to claim 8 wherein about 0.5 to about 1.5 equivalents of N-aminoethylpiperazine is present per equivalent of the polymerized fatty acid.

12. A composition according to claim 8 further comprising an organic solvent.

13. An adhesion promoter for vinyl chloride plastisols which is a non-gelled condensation product of
   a) dimer acid; and
   b) a mixture of amines being present in a concentration of about 22 to about 25 percent by weight of the condensation product and producing therein a final amine value that ranges up to about 225, said mixture being comprised of triethylenetetramine, tetraethylenepentamine or mixtures thereof, and N-aminoethylpiperazine, said N-aminoethylpiperazine being present in a concentration to provide from about 0.5 to about 1.5 equivalents thereof per equivalent of dimer acid.

14. A composition according to claim 13 further comprising an organic solvent.

* * * * *